United States Patent [19]
Smith

[11] 3,755,690
[45] Aug. 28, 1973

[54] M.O.S. INPUT CIRCUIT WITH T. T. L. COMPATABILITY

[75] Inventor: Frederick J. Smith, Centereach, N.Y.

[73] Assignee: Standard Microsystems Corp., Hauppauge, N.Y.

[22] Filed: June 6, 1972

[21] Appl. No.: 260,328

[52] U.S. Cl. .................................. 307/205, 307/251
[51] Int. Cl. .......................................... H03k 19/08
[58] Field of Search .................... 307/205, 221, 251, 307/279, 304

[56] References Cited

UNITED STATES PATENTS 3,676,700 7/1972 Buchanan .......................... 207/251
3,602,732 8/1971 Suzuki ............................... 307/304

*Primary Examiner*—John W. Huckert
*Assistant Examiner*—R. E. Hart
*Attorney*—Nichol M. Sandoe et al.

[57] ABSTRACT

A circuit for interfacing between the output of a TTL circuit and the input of an MOS circuit is described which utilizes a switchable pull-up resistor connected between the TTL circuit output and a voltage line to translate the level of the TTL output to a level compatible with the requirements of the MOS circuit.

4 Claims, 5 Drawing Figures

M.O.S. INPUT CIRCUIT WITH T. T. L. COMPATABILITY

Figure 1:
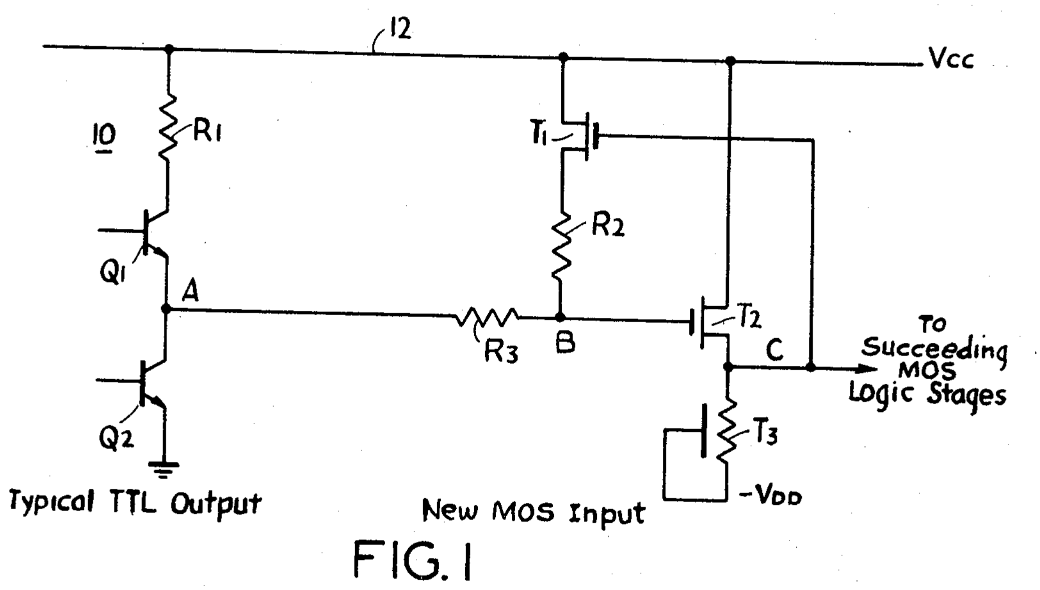

The present invention relates generally to MOS circuits, and more particularly to a circuit for providing signal level translation between a TTL circuit output and the input of an MOS logic circuit.

Although the use of MOS devices and circuits by designers of logic circuits and systems has significantly increased in recent years, transistor-transistor logic (TTL) circuits are still frequently employed, particularly in applications in which TTL circuits provide advantages over MOS circuits. TTL logic circuits may, in certain applications, offer the logic designer greater flexibility, higher operating speeds, and lower costs for certain types of standard logic circuits and modules.

On the other hand, MOS circuits including insulated-gate field-effect transistors (FETs) offer the logic designer the opportunity to achieve significantly greater integration density and reduced power drain. Moreover, certain types of MOS circuits such as memories, shift registers and the like are comparably, if not lower priced, then corresponding TTL circuits and stages.

In an attempt to achieve optimum performance of logic systems in terms of cost, reliability, integration density, and operating speed, the logic designer often combines TTL and MOS circuits into a single hybrid logic system. One problem that must be overcome by the designer of a TTL-MOS logic system is that the output levels of TTL circuit are generally incompatible for the requirements of MOS circuits, that is, the levels of TTL output signals are generally lower than that required by MOS devices such as FETs.

The output of a TTL gate or circuit is usually specified as 2.4v for a logic "1" signal and 0.4v for a logic "0" signal. An MOS FET, however, generally requires a higher deviation in the voltage levels at its input (gate) to switch the FET between an "on" and an "off" condition corresponding to the two binary states. An interface signal level translater must thus be provided at the interfact between the TTL output and the MOS input.

In a conventional TTL-MOS interface, a discrete pull-up resistor is connected between the TTL output and a voltage line to raise the TTL output level to that of the voltage line. That resistor draws a steady current from the system power supply whenever the TTL output is at one of its two binary levels. This continuous flow of current significantly increases the power supply requirement and cost of circuit operation, particularly when ten or more interfaces are employed as is common. In addition, the requirement for adding discrete resistors to the interface increases production costs of the circuit. An alternative technique that has been employed is to implement the pull-up resistor as part of the MOS circuit. This, however, has the adverse effect of significantly increasing the power consumption of the MOS package.

Another disadvantage of the conventional TTL-MOS interface circuits is the sensitivity of the MOS input to noise in the TTL output signal. Thus, for example, noise occurring on the TTL output signal may cause the MOS circuit to improperly switch between logic states, particularly in the period of transition of the TTL output between logic levels, that is, before the MOS input becomes stabilized at one of the two translated logic levels.

It is an object of the invention to provide an interface between a TTL circuit and an MOS circuit which draws no direct current in the MOS input, thus reducing the power dissipation requirements for the MOS package.

It is a further object of the invention to provide a TTL-MOS interface circuit which draws a reduced amount of current and is hence more economical in operation than the previously known interface circuits.

It is a general object of the invention to provide an improved MOS circuit for directly interfacing with a TTL output.

It is yet a further object of the invention to provide an interface circuit of the type described in which hysteresis is provided at the MOS input.

It is still a further object of the invention to provide an interface circuit of the type described which has significantly reduced sensitivity to noise in the TTL output signal.

Toward the furtherance of these ends, the interface circuit of the invention includes a switched resistor connected between the TTL output (or MOS input) and a voltage line. The conduction of the switched resistor is controlled by the output of a switching element, which is in turn controlled by the level of the TTL output signal. The switched resistor replaces the conventional pull-up resistor and has the advantage of eliminating the flow of direct current in the interface circuit.

To the accomplishment of the above and to such further objects as may hereinafter appear, the present invention relates to an improved interface circuit substantially as defined in the appended claims, and as described in the following specification taken together with the accompanying drawing in which:

FIG. 1 is a schematic diagram of the circuit of the invention as employed as a TTL-MOS interface circuit; and FIGS. 2 *a* – 2 *d* are voltage and current waveforms obtained in the circuit of FIG. 1.

The circuit of the invention is illustrated in FIG. 1 as an interface between the output of a typical TTL logic stage generally designated 10 and the input of an MOS logic stage. The minimum and maximum values for the output of the TTL circuit, defined between the emitter of bipolar transistor Q1 and the collector of bipolar transistor Q2, is specified at about 2.4v for a logic "1" output, and about 0.4v for a logic "0" output, respectively. The collector of transistor Q1 is connected through a resistor R1 to a $V_{CC}$ voltage line 12, which, as herein described, is at a level of +5 volts. The emitter of transistor Q2 is connected directly to ground. The bases of transistors Q1 and Q2 receive input logic signals and produce the proper logic output signal in a manner known to those skilled in the art of logic design. The logic signals produced at the TTL output are, however, too low to reliably switch the MOS devices (FETs) into the proper state of conductivity in response to the logic sense of the TTL output. It is generally in TTL-MOS logic circuits to provide an interface or signal level translater between the TTL output and the MOS input to translate the output levels of the former to levels that can be utilized by the latter.

In a conventional TTL-MOS interface circuit, a pull-up resistor is connected between the TTL output and a voltage line such as line 12 to raise the TTL output to the 5 volt level required for satisfactory operation of the MOS circuit. The pull-up resistor employed in the conventional interface circuit, however, draws direct current whenever the TTL-output level is at or near ground and thus creates a significant drain on the system power supply. If the pull-up resistor is incorporated on the MOS chip it significantly increases the circuit power consumption, thereby raising the chip temperature and impairing the performance of the MOS circuit.

The disadvantages of the prior art interface circuit are largely eliminated by the interface circuit of the invention which draws no direct current at any time, and draws switching current only during the brief periods of transition in the TTL output signal. The circuit of the invention, in accordance with the embodiment shown in FIG. 1, includes an input node A coupled to the output of the TTL circuit, an intermediate node B, and an output node C coupled to one or more succeeding MOS logic stages (not shown). A first switching device, here shown in the form of an MOS FET T1, has a source connected to $V_{CC}$ line 12 and a drain connected through a resistor R2 to node B, which is in turn connected to node A and to the TTL output through a resistor R3.

Node B is also connected to the gate of a second switching device, here shown in the form of an FET T2, which has a source connected to $V_{CC}$ line 12 and a drain connected through an MOS resistive element T3 to a negative voltage source $V_{DD}$. The gate of element T3 is also coupled to the $V_{DD}$ voltage line. Node C, which defines the MOS input terminal, is connected to the drain of FET T2 and to the gate of FET T1. The source-drain path of these FETs may be considered as an output circuit which is rendered conductive only when a voltage equal to or exceeding a threshhold voltage is applied to the gate of the FET, which may be considered as the control terminal of the FET.

In the operation of the circuit of FIG. 1, the TTL output at node A (and node B as well) is first assumed to be at or near ground corresponding to a binary "0" signal. FET T2 is thus conductive ("on") and node C is charged toward $V_{CC}$ so that FET T1 is nonconductive ("off"). When the output of the TTL circuit rises to a level of about 2.4 volts (logic "1") FET T2 starts to turn off, and node C charges through resistive element T3 toward the negative voltage $V_{DD}$, to in turn cause FET T1 to be rendered conductive and node B (and node A) to be pulled toward $V_{CC}$ or +5 volts. Once nodes A and B reach the $V_{CC}$ level, current ceases to flow in the interface circuit.

When the output of TTL circuit 10 falls to about 0.4 volts, corresponding to a logic "0" output, the voltage at node B becomes sufficiently negative with respect to $V_{CC}$ to cause FET T2 to be again turned on causing node C to be charged toward $V_{CC}$. The positive $V_{CC}$ voltage at node C causes FET T1 to be turned off allowing the voltage at nodes A and B to reach the same level as the TTL output. Since FET T1 is nonconductive, no direct current flows in either the TTL output or the MOS input interface circuit.

Figure 2A:
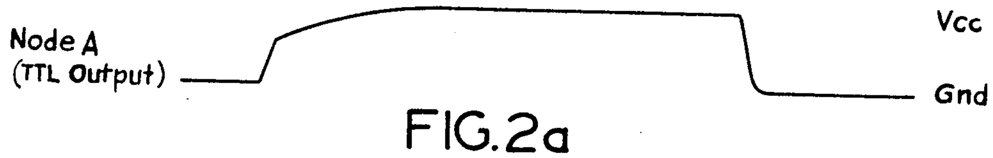
Figure 2B:
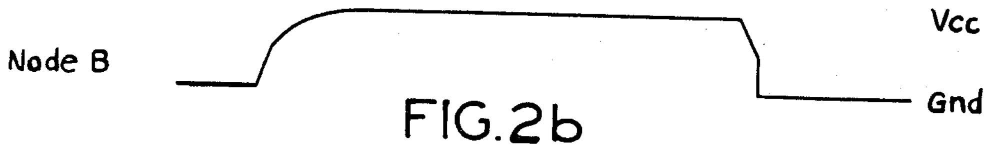
Figure 2C:
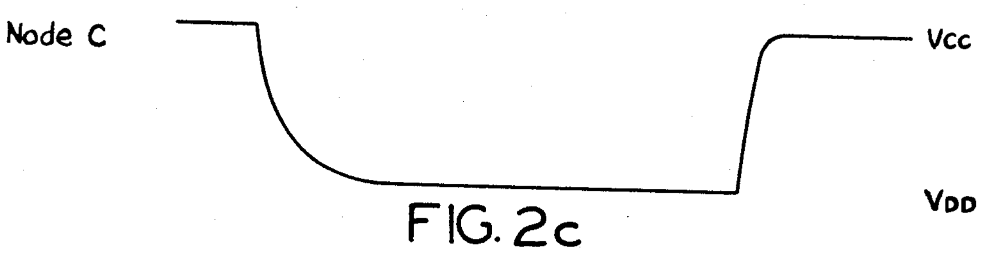
Figure 2D:

FIGS. 2*a*, *b*, and *c* respectively illustrate the voltage waveforms developed at nodes A, B, and C for the interface circuit operation just described for the two binary logic levels of the TTL output. As therein shown, the voltages at nodes A and B each vary between ground and $V_{CC}$, and the voltage at node C swings between $V_{CC}$ and $V_{DD}$ for the two binary logic levels. Significantly, as shown in FIG. 2*d*, current flows in resistors R2 and R3 only during the relatively brief periods of transition in the output of the TTL stage.

The MOS interface circuit of the invention thus satisfies the objects set forth above in that it provides the function of the prior art pull-up resistor to translate the TTL output to an increased level suitable for use in an MOS stage, but in significant contrast to the prior art interface circuits, draws no direct current at any time; only switching and charging currents flow during the transition in the TTL circuit output.

In addition, the interface circuit of the invention exhibits an inherent hysteresis. That is, the voltage trip levels from positive and negative edges differ because when FET T1 is initially on, additional current must be drawn from the MOS input to turn FET T2 on and turn FET T1 off. The amount of hysteresis is determined by the resistance of resistors R2 and R3 and the on-resistance of FET T1. If the latter has an on-resistance that is low compared to the resistance of resistors R2 and R3, the circuit hysteresis is determined primarily by the ratio of these resistors. The ratio of these resistors, when formed by known MOS diffusion techniques, can be controlled with great accuracy.

As a result of this hysteresis, the MOS stage is far less sensitive to any noise that may appear at the TTL output, which in a conventional TTL-MOS interface circuit may produce improper switching in the logic states of the MOS circuit. As a result of the hysteresis characteristic of the interface circuit of the invention, once the switching FET T1 is placed in the on state, it will remain in that state until the voltage at node A decreases to a sufficiently low level to cause T2 to become conductive.

In one form of the circuit of the invention, resistors R2 and R3 were diffused MOS resistors each having a value of approximately 1 kilohm. If desired, resistor R2 may be formed as part of the drain output circuit of FET T1, rather than as a separately diffused MOS resistor as is herein shown.

Thus, while the interface circuit of the invention has been herein described with respect to a single embodiment thereof, it will be understood that variations and modifications may be made therein, without necessarily departing from the spirit and scope of the invention.

What is claimed is:

1. An interface circuit for coupling between a first logic stage having a first range of output signal levels and a second logic stage employing input signal levels different than said first stage output signal levels, said interface circuit comprising an input node for coupling to the output of the first logic stage and an output node for coupling to the input of the second logic stage, a voltage line at a level corresponding to one of the second logic stage signal levels, switching means having a control element and an output circuit coupled between said voltage line and said input node and effective when conductive to establish said output node at a first logic level, and when non-conductive to establish said output node at a second logic level, and control means coupled to said input node for controlling the conductive state of said switching means, said control means comprises second switching means having a control element coupled to said input node and an output circuit coupled to said voltage line and to the control element of said first named switching means, said output node being coupled to the output circuit of said second switching means and the control element of said first switching means.

2. The circuit of claim 1, further comprising resistor means coupled between the output circuit of said first switching means and an intermediate node, the latter being coupled to said input node and the control element of said second switching means.

3. The circuit of claim 2, further comprising second resistor means coupled between said input node and said intermediate node.

4. The circuit of claim 1, in which said output logic stage is a TTL stage and said input stage is an MOS stage, said first and second switching means each comprising an MOS FET.

* * * * *